United States Patent [19]

Nishiguchi

[11] 4,445,204
[45] Apr. 24, 1984

[54] MEMORY DEVICE

[75] Inventor: Yukihiro Nishiguchi, Tokyo, Japan

[73] Assignee: Nippon Electric Co., Ltd., Tokyo, Japan

[21] Appl. No.: 308,645

[22] Filed: Oct. 5, 1981

[30] Foreign Application Priority Data

Oct. 3, 1980 [JP] Japan .................. 55-142125

[51] Int. Cl.³ .............................................. G11C 7/00
[52] U.S. Cl. .................................... 365/194; 365/233
[58] Field of Search ................... 365/194, 189, 233

[56] References Cited

U.S. PATENT DOCUMENTS 4,090,096 5/1978 Nagami ........................ 365/194
4,337,523 6/1982 Hotta et al. .................. 365/194

FOREIGN PATENT DOCUMENTS 55-38603 3/1980 Japan ........................ 365/194

OTHER PUBLICATIONS

Meadows et al., "Programmable Store Variation," IBM Tech. Disc. Bul., vol. 9, No. 10, 3/67, pp. 1399–1400.
Arzubi, "Encoded Variable Delay for Driver Circuits," IBM Tech. Disc. Bul., vol. 22, No. 2, 7/79, pp. 518–519.

Primary Examiner—Stuart N. Hecker
Attorney, Agent, or Firm—Sughrue, Mion, Zinn, Macpeak & Seas

[57] ABSTRACT

A memory device provided with an improved control circuit for enabling effective interface with a CPU. The device comprises a memory circuit, a first terminal for receiving a strobe signal for placing the memory circuit in an accessed state, a second terminal for receiving a chain of clock signals, digital counter for counting the clock signals in response to the strobe signal having a plurality of different value of count, output terminals, a circuit for selectively deriving a count signal from one of the count output terminal according to a programmed state, and a ready signal generating circuit for generating a ready signal for indicating the completion of the access operation of the memory circuit in response to the count signal.

12 Claims, 6 Drawing Figures

FIG. 1
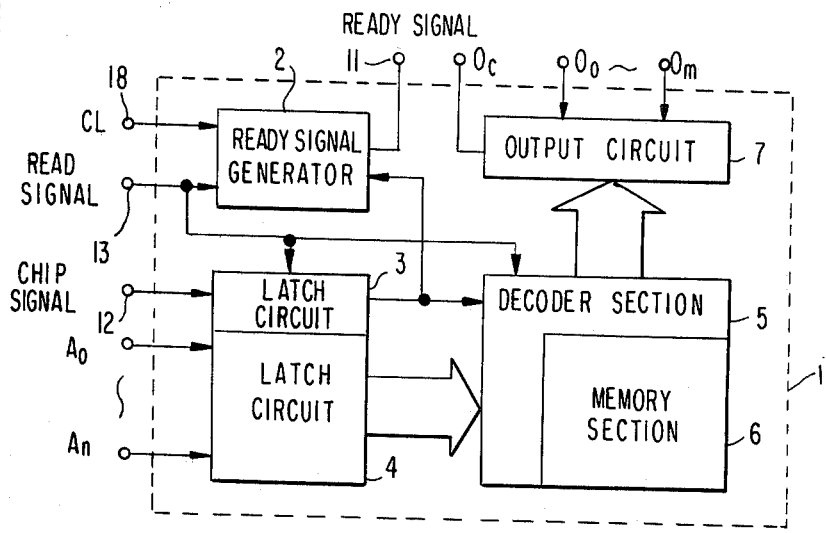
FIG. 2
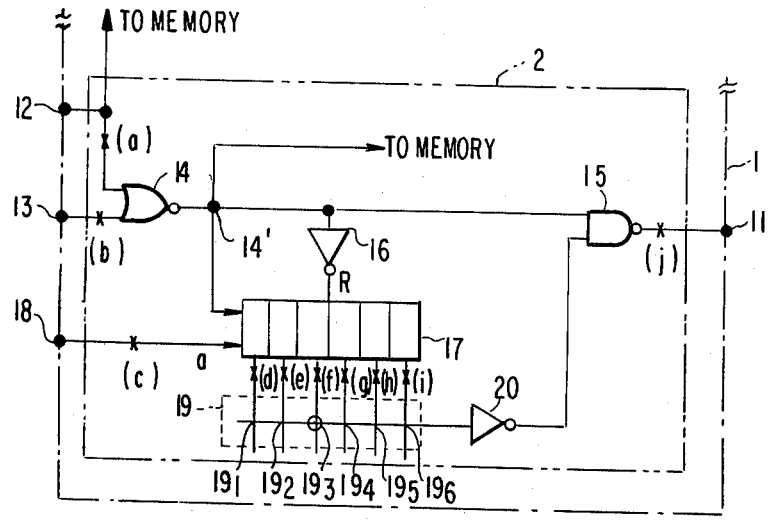
FIG. 3

MEMORY DEVICE

BACKGROUND OF THE INVENTION

The present invention relates to a memory device, and more particularly a semiconductor memory device fabricated as an integrated circuit (hereinafter abbreviated as "IC").

In general, an access operation of a memory such as a read-only memory (hereinafter abbreviated as "ROM"), a random access memory (hereinafter abbreviated as "RAM") fabricated as an IC (memory IC) is controlled by a control processing unit (hereinafter abbreviated as "CPU") which controls a system including the memory IC's. In this respect, interfacing between memory IC's and CPU, has been a significant problem. Basically it is possible to match the interfacing provided that structures of addresses and data buses are coincident between the CPU and the memory IC's. However, in such cases, there still remains a problem in that the processing time required for a data read from a memory IC (hereinafter called "access time") is not identical to the duration of a read signal or a write signal from a CPU. The aforementioned access time is largely influenced by the memory capacity, an internal circuit structure of the memory IC. In recent years, large-capacity memories have been required in various application systems, hence there is a trend toward developing memory IC's having increased capacity. As the memory capacity is increased, the load capacitance of the memory is greatly increased, resulting in elongation of the access time.

In addition, in application systems employing batteries as a power supply, memory IC's consisting of complementary MOS device (hereinafter abbreviated as "CMOS") constructions operable with low power consumption are used in place of the heretofore known memory IC's consisting of n-channel MOS device (hereinafter abbreviated as "nMOS") constructions. Memory IC's of CMOS construction require long access time as compared to memory IC's of nMOS construction, although the former operate with low power consumption. In particular, in a CMOS ROM, in which a plurality of n-channel transistors as memory cells are connected in series for the purpose of enhancing the degree of integration, the access time of the ROM is determined by the number of the serially connected transistors performing as a time constant circuit, so that the access time of such CMOS type ROM is several-ten-fold longer as compared to the high-speed ROM's.

In the case of a memory IC having an access time equal to or shorter than that required by the CPU, the CPU can operate at its inherent speed. However, in the case of a memory IC having an access time longer than that required by the CPU, it is necessary to elongate the read signal and the write signal by extending the read cycle and the write cycle, respectively, of the CPU.

However, among the known methods, the method of slowing down the operation speed of a CPU has a shortcoming that the operation and processing speed of the entire application system is slowed down because the operation speed of the CPU is slowed down even at a time other than an access time of a memory IC.

In addition, in the case of utilizing a ready function, as above referred ready signal circuit, separate circuits are necessitated for respective memory IC's each having a different access time. There exists the disadvantage that the above-referred ready signal circuits are as many as the number of species of the access time of the memory IC's employed in the application system.

Moreover, in order that each of the above-referred ready signal circuits may operate only when a relevant memory IC has been selected, the respective ready signal circuits must be associated with a selection circuit such as an address decoder, and hence there is a disadvantage that the circuit construction becomes complex.

In recent years, construction of application systems has been made compact by making use of large-capacity memories, and even a handy type application system is manufactured in which a CPU, ROM, RAM, etc. are all formed of a CMOS structure. Accordingly, as application systems becomes more compact, it is desirable for the systems to have a smaller number of the mentioned additional circuits. Hence addition of the above-referred ready signal circuits as well as the aforementioned selection circuits, as is the case with the prior art, not only would prevent the application system from being made compact but also would result in a rise of the system cost, and this would be a big disadvantage.

SUMMARY OF THE INVENTION

It is therefore one object of the present invention to provide a memory device which can realize optimum interfacing to a CPU.

Another object of the present invention is to provide a memory integrated circuit in which a memory device having a long access time can be accessed within an optimum access time without externally providing an additional circuit whereby a system can be made compact and processing efficiency can be enhanced.

According to one feature of the present invention, there is provided a memory integrated circuit in which a digital delay circuit having a plurality of bit stages adapted to be reset at the beginning of an access time and applied with a clock at its input and a selection circuit for selectively outputting any one of the contents in the plurality of bit stages, are formed on the same chip as a memory device.

BRIEF DESCRIPTION OF THE DRAWINGS

The above-mentioned and other features and advantages of the present invention will become more apparent by reference to the following detailed description of the invention taken in conjunction with the accompanying drawings, wherein:

FIG. 1 is a block diagram showing one preferred embodiment of a memory integrated circuit according to the present invention in which a ready signal generator circuit is included, FIG. 2 is a block diagram showing a ready signal generator circuit according to one preferred embodiment of the present invention, FIG. 3 including a-j, is a time chart showing operation waveforms at various points in the ready signal generator circuit in FIG. 2.

DETAILED DESCRIPTION OF THE INVENTION

Figure 4:
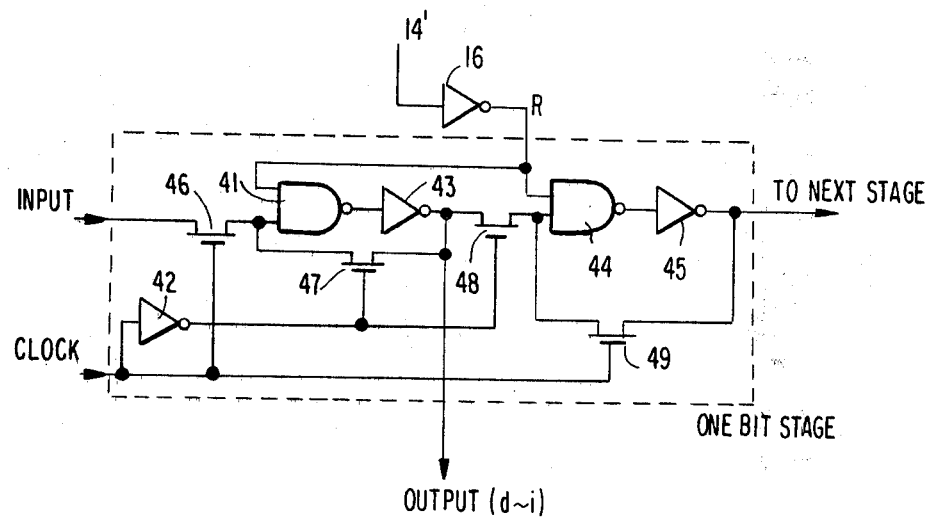
FIG. 4 is a block diagram showing a one-bit age in a shift register as used in the ready signal generator circuit in FIG. 2.

Now the present invention will be described in greater detail with reference to the accompanying drawings.

A memory integrated circuit according to the present invention in which a ready signal generator circuit is contained, is illustrated in FIG. 1. In the following description a ROM is employed as the memory. However it will be obvious that the present invention can be equally applicable in the case of a RAM.

A ROM IC 1 comprises a ready signal generator circuit 2 including a shift register or a counter, a chip-select latch circuit 3, an address latch circuit 4, a decoder section 5, a memory section 6 including memory cells in a matrix of rows and columns and an output circuit 7. A chip-select signal for designating access to this particular ROM and address signals $A_o$-$A_n$ (the value of 'n' being determined at a given number depending upon a memory capacity of the memory section 5) for addressing the ROM are respectively stored in the latch circuit 3 and the latch circuit 4, respectively, upon level change of a read signal from "1" to "0" (upon falling). During the period when the read signal is at the "1"-level, the decoder section 4 designates no address in the memory section 5 regardless of the contents in the latch circuit R3 and latch circuit 4. When the read signal as an access request signal changes from "1"-level to "0"-level, the chip select signal as well as the address signals $A_o$-$A_n$ are latched in the respective latch circuits 3 and 4, and applied to the decoder section 5. In addition, the ready signal generator circuit 2 starts its operation as digital delay means and generates a ready signal after a predetermined number of clock signals which are commonly utilized both for a CPU and this ROM. The decoder section 5 decodes the address signals $A_o$-$A_n$ to designate one address of the memory section 6 if the chip select signal is in an active state. In the output circuit 7 for outputting data at the designated address, if an output control signal (OC) is in an active state, the output signals from the memory section 6 are derived from output terminals $O_o$-$O_m$ (the value of 'm' being varied depending upon the memory structure, but if the output control signal (OC) is in an inactive state, the output terminals $O_o$-$O_m$ take indeterminate states (high-impedance states).

Accordingly, a delay time determined by a clock signal and a programmed value of a number of delay bits in the ready signal generator circuit as will be described later is selected at a predetermined value which corresponds to the period from the time when demand for access from a CPU (not shown) has been received to the time when an output becomes effective, so that a ready signal may be held in an active state during the period after the read signal has changed from "1"-level to "0"-level until the decoder section 5, memory section 6 and output circuit 7 operate and data are output at the output terminals $O_o$ to $O_m$.

FIG. 2 shows, in a block form, a structure of an essential portion of one preferred embodiment of the present invention, which comprises a ready signal generator circuit 2 contained in a ROM IC 1. A read signal (b) applied through a terminal 13 is led to one input terminal of a NOR circuit 14. To the other input terminal of the NOR circuit 14 is applied a chip select signal (a) issued from a CPU through a terminal 12. This chip select signal (a) is a signal whose level becomes a low level when the ROM IC 1 is selected, and when the ROM IC 1 has been selected, the read signal (b) issued from the CPU becomes effective and is input to the ready signal generator circuit 2 contained in the selected ROM IC 1 through the NOR circuit 14. The output signal of the NOR circuit 14 is led to a NAND circuit 15 and an inverter 16 in the ready signal generator circuit 2, and besides, it is led to a circuit outside of the illustrated region as a read control signal. Furthermore, the output of the NOR circuit 14 is led to an input terminal of a shift register 17. This shift register has a "6-bit structure" in the illustrated embodiment, and it has a structure adapted to shift in response to a rising edge of a clock signal (c) applied through a terminal 18. The respective bit outputs of this shift register 17 is led to a selection circuit 19. The cross-points $19_1$, $19_2$, $19_3$, $19_4$, $19_5$ and $19_6$ between the outputs of the shift register 17 and an output line of the selection circuit 19 are normally opened, and hence the respective outputs of the shift register 17 are not related to the output of the selection circuit 19. If the output line of the selection circuit 19 is connected to one output of the shift register 17 at the corresponding one of the above-described cross-points $19_1$ to $19_6$, then the output from the bit stage of the shift register 17 corresponding to the connected cross-point appears at the output of the selection circuit 19. In the illustrated example, since connection is made at the cross-point $19_3$ (marked by a small circle in FIG. 2), the output from the "third bit" stage of the shift register 17 appears at the output of the selection circuit 19. By changing the connected cross-point in the selection circuit 19, the output bit stage of the shift register 17 can be varied. In other words, a count value for the clock can be varied.

The output of the selection circuit 19 is led to the other input terminal of the above-referred NAND circuit 15. The output of this NAND circuit 15 is connected to a terminal 11 to output a ready signal (j) for controlling a ready function of a CPU located outside of the illustrated region. The setting of the states of the cross-points in the selection circuit 19 is preferably achieved through a similar process to the setting of memory codes in a ROM IC Now, with reference to FIG. 3, description will be made on the characteristic operations of the ready signal generator circuit 2 of FIG. 2. When this particular ROM IC 1 is not selected, since the chip select signal (a) is at a high level, the output of the NOR circuit 14 takes a low level, and hence the output of the NAND circuit 15, that is, the ready signal (j) is maintained at a high level. Here it is to be noted that in a system employing a plurality of ROM IC's, since a CPU checks the ready signal of only the selected ROM IC, the ready signals from other ROM IC's are kept at a high level so that it may not effect the ready signal of the selected ROM IC.

Assuming now that this ROM IC 1 has been selected, then the chip select signal (a) is at a low level. However, as the shift register 17 is kept reset by receiving a reset signal R from the inverter 16 i.e. its initial state while the read signal (b) is maintained at a high level, the outputs from the respective bit stages of the shift register 17 are all held at a low level. In addition, since the output of the NOR circuit 14 is at a low level, the output of the NAND circuit 15, that is, the ready signal (j) is maintained in a high level condition.

Subsequently, when the read signal (b) changes from a high level to a low level upon an access command, the output of the NOR circuit 14 is turned to a high level, while the output of the inverter 20 is held at a high level, so that the output of the NAND circuit 15 changes to a low level, and thus the ready signal (j) is turned to a low level. When a CPU located outside of the illustrated region has detected the low level of the ready signal (j), it enters into a wait condition for prolonging access to a memory. In addition, when the read signal (b) takes a low level and thus the output of the NOR circuit 14 changes to a high level, the high-level output releases the shift register 17 from its reset condition via the inverter 16, so that the shift register 17 has the high level at the output of the NOR circuit 14 input thereto at the subsequent first rising edge of the clock signal (c) applied through the terminal 18 (denoted by ① in FIG. 3) and shifts by one bit. Therefore, the output from the first bit stage of the shift reigster 17 takes a high level (denoted by ⑥ in FIG. 3). However, the output of the selection circuit 19 which is derived from the third bit stage output of the shift-register 17, is still kept at a low level. Consequently, the ready signal (j) is held at a low level. At the second rising edge of the clock signal (c) (denoted by ② in FIG. 3), the shift-register again shifts by one bit, so that the output of the second bit stage of the shift register 17 changes to a high level (denoted by ⑦ in FIG. 3), but the ready signal (j) still remains at a low level.

Next, at the third rising edge of the clock signal (denoted by ③ in FIG. 3), the output of the third bit stage of the shift register 17 changes to a high level (denoted by ⑧ in FIG. 3), hence the input of the inverter 20 takes a high level, and thus the output of the inverter 20 is turned to a low level. As a result, the output of the NAND circuit 15 changes to a high level, and the ready signal (j) takes a high level (denoted by ④ in FIG. 3) which represents an active condition. Under such an active condition, a CPU located outside of the illustrated region is informed that data have been established in the ROM IC 1. Accordingly, if the period when the ready signal (j) is at a low level representing an inactive condition (denoted by ⑤ in FIG. 3), is selected to be a little longer than the access time of the ROM IC 1, then the CPU can get the established data from the ROM IC 1, because the CPU is adapted to take in data only after it has confirmed that the ready signal (j) changes to a high level.

As described above, the period when the ready signal (j) is at a low level (in an inactive condition) is substantially determined by a repetition period of the clock signal (c) and a number of clock pulses of the clock signal to be input to the shift register 17 during that period. Therefore, in the event that another CPU is connected to this ROM IC 1 and a different clock signal having a repetition period equal to one-half of that of the above-described clock signal (c) is input to the ROM IC 1, then the cross-point 19₆ in the above-described selection circuit 19 is closed to connect the sixth bit stage output to the output line of the selection circuit 19, so that after the read signal (b) changed to a low level, at the sixth rising edge of the clock signal (c) the ready signal (j) may be turned to a high level (an active condition). In this modified case, the duration of the period when the ready signal (j) is kept at a low level (in an inactive condition) is substantially equal to that in the first-described case where the cross-point 19₃ in the selection circuit 19 is closed to connect the third bit stage output to the output line of the selection circuit 19. Therefore, an inactive condition of the ready signal having an optimum duration for the access time of the ROM IC 1 can be established. In addition, even in the case where a repetition period of a clock signal is 1.5 times as large as that in the first-described case, likewise the inactive period of the ready signal (j) can be set nearly at the same value as the above-described two cases by closing the cross-point 19₂ in the selection circuit 19 to connect the second bit stage output of the shift register 17 to the output line of the selection circuit 19.

In this way, by varying the selective connection at one of the cross-points between the respective bit stage outputs of the shift register 17 and the output line of the selection circuit 19, the duration of an inactive condition of the ready signal can be controlled so as to meet an access time of a memory device. Furthermore, by employing a structure of the ROM IC 1 in which the setting of the selection circuit 19 can be achieved in the same process as the setting of the memory codes i in the ROM, the setting of the duration of an inactive condition of the ready signal by selective connection of the cross-points 19₂–19₆ in the selection circuit 19, can be made at an optimum number of clock cycles depending upon the reference input clock signal of a CPU or a system when the memory codes are set in the ROM.

Now the detailed structure of the shift register 17 will be described in connection to one bit stage therein with reference to FIG. 4. Each stage in the shift register 17 comprises inverters 42, 43 and 45, NAND circuits 41 and 44, and transfer gates 46 to 49. The transfer gates 46 and 49 become active when a clock signal is "1" to pass an input signal from the left to the right as viewed in FIG. 4. The transfer gates 47 and 48 become active when a clock signal is "0" and hence the output of the inverter 42 is "1". Accordingly, when the clock signal is "1", the transfer gates 46 and 49 become active and an input signal is taken in the stage through the gate 46. A latch consisting of the NAND circuit 44, inverter 45 and gate 49 serves to store data. The circuit in the next succeeding stage takes in the content of this latch in a similar manner. Subsequently, when the clock signal becomes "1", the input data which has been already taken in is stored in a latch composed of the NAND circuit 41, inverter 43 and gate 46, and also it is input to the NAND circuit 44 via the gate 48. By repeating the above-described operations, data shift by 1 bit is effected during the changes of the clock signal of from "1" to "0" to "1". Reset of the shift register is achieved by resetting the latch consisting of the NAND circuit 41, inverter 43 and gate 47 and the latch consisting of the NAND circuit 44, inverter 45 and gate 49 by changing the other inputs of the NAND circuits 41 and 44 to "0". The output from the inverter 43 is used as the output from the shift register stage to the selection circuit 19.

Figure 5:
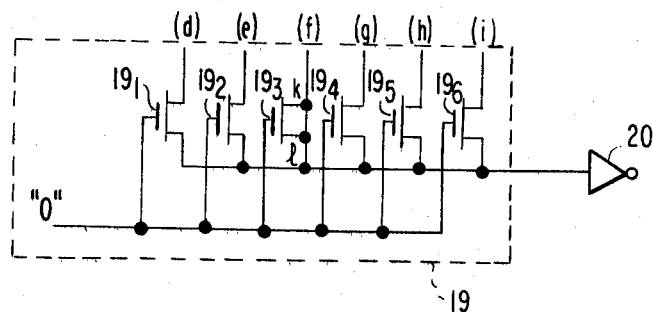
FIG. 5 is a circuit diagram showing a selection circuit as used in the ready signal generator circuit in FIG. 2.

Now description will be made of one practical example of the selection circuit 19 with reference to FIG. 5. In this example, the respective programmable elements 19₁–19₆ have transfer gate structures, whose gates all a "0"-level applied thereto, and hence, all these elements are not in an inactive condition. Accordingly, input lines (d)–(i) are normally disconnected from output line (m) of the selection circuit 19. However, if the selection circuit 19 is programmed as marked by a small circle at a cross-point element 19₃ in the example shown in FIG. 2, the input line (f) and the output line (m) of the gate 19₃ are connected together (through the same process as used for storing ROM codes in a memory section), and hence, the input signal on the input line (f) is input to the inverter 20 in FIG. 2 through the output line (m).

With regard to the process for short-circuiting the input line (f) to the output line (m) in the element $19_3$, it can be achieved by making the operation mode of the transistor $19_3$ a depletion mode by selectively injecting the same impurity as the source and the drain into the channel region. Alternatively, so-called non-volatile memory elements employing floating gate structures could be used for the respective elements $19_1$–$19_6$ and the element $19_3$ could be programmed into a depletion mode or normally conductive mode, by giving it a low threshold value.

While the above-described embodiment disclosed the case where the number of input clock pulses in a clock signal is made to be programmable by shifting an output connection point in a selection circuit employing a shift register, alternatively the shift register can be realized, for example, by serially connecting flip-flops. In addition, the function of the shift register can be achieved by counting a number of clock pulses in the input clock signal by means of a counter. In this case, it is preferable to employ a circuit structure in which a mode counter is provided, a predetermined count is preset in the mode counter and the ready signal is controlled when the count in the clock counter and the count in the mode counter coincide with each other.

Figure 6:
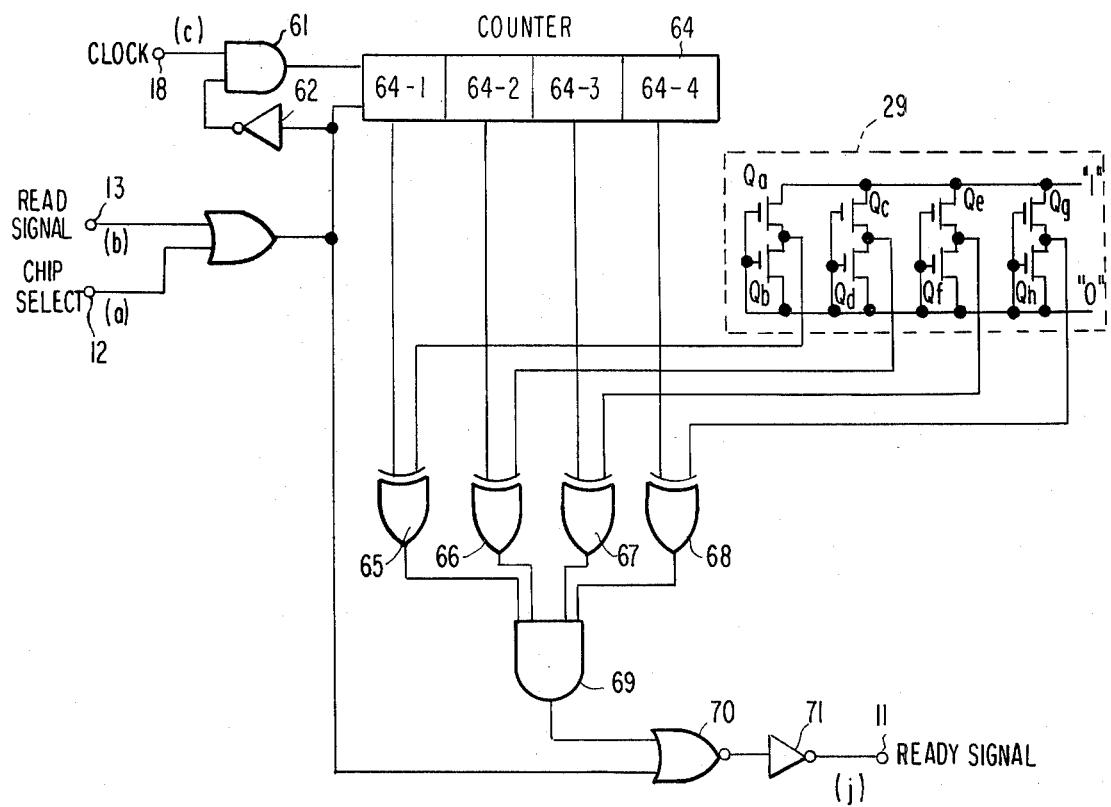
FIG. 6 is a block diagram showing a ready signal generator circuit according to another preferred embodiment of the present invention.

Another preferred embodiment of the present invention will be described in the following with reference to FIG. 6. This embodiment is one example of the circuit structure in which the ready signal generator circuit is formed by making use of a counter. In this embodiment, in the event that either a read signal (b) is "1" or a chip select signal (a) is "1" (not in an active condition), an output of an OR circuit 14 becomes "1", and hence a counter 64 is reset. At the moment, since an output of an inverter 62 is "0", an output of an AND circuit 61 is fixed to "0". Accordingly, the outputs of the counter 64 are all "0", hence outputs of exclusive-OR circuits 65 to 68 are all "0", and hence, an output of an AND circuit 69 is held "0". Since an output of a NOR circuit 70 is fixed to "0" by the "1" output of the OR circuit 14, a ready signal (j) at a terminal 11 is "1". In a programming circuit 29, either "1" or "0" is output on each one of four output lines by interconnecting an input and an output of either one of two transfer gates connected to each output line. Accordingly, in order that coincidence may occur when the count in the counter 64, that is, the binary codes in the respective stages 64-1-64-4 are 1010, it is only necessary to program the programming circuit 29 so that the input and output of each of the programming transistors $Q_a$, $Q_d$, $Q_e$ and $Q_h$ in the circuit 29 may be interconnected. When both the chip select signal (a) and the read signal (b) become "0" (an active condition) and hence the output of the OR circuit 14 becomes "0", the counter 64 starts its operation, and the ready signal (j) becomes "0". Subsequently, when the count in the counter 64 coincides with the output of the programming circuit 29, the output of the AND circuit 69 becomes "1", and so, the ready signal (j) also becomes "1". As described above, a ready signal generator circuit can be formed of a counter, a programming circuit and a coincidence circuit.

As described in detail above, according to the present invention, on the same chip as a memory circuit there is provided a circuit which can be arbitrarily set so that clock pulses in a reference input clock signal are counted and when a number of clock pulse matched to an access time has been counted a ready signal may be output. Therefore, it becomes possible to access to a memory device having a long access time in an optimum access time. Furthermore, it is possible to make a system compact and enhance the processing efficiency of a system. Moreover, since a programmed condition of a selection circuit can be set when memory codes are set in a ROM IC, the number of clock pulses to be counted can be varied depending upon a repetition frequency of an input clock signal fed from a system or a CPU, and thus there is obtained an advantage that a ready signal which is optimum for an access time of a memory device can be generated.

I claim:

1. A memory device comprising a plurality of memory cells, means for receiving address signals, means for selecting at least one of the memory cells in accordance with said address signals, means for receiving an access request signal, at least one output terminal, means responsive to said access request signal for producing read-out signal from the selected memory cell after its operation period, means for receiving a chain of clock signals, digital delay means including a plurality of bit stages, means for applying said access request signal to said digital delay means, means for applying said clock signals to said digital delay means, said digital delay means sequentially energizing said plurality of bit stages one by one in accordance with the increase of number of said clock signals applied thereto after receipt of said access request signal, programmable means having a plurality of input lines each receiving a signal from the associated bit stage of said digital delay means, an output line intersecting with said input lines and a plurality of programmable elements disposed at the intersections of said input lines, each of said programmable elements being capable of taking one of a first state for electrically isolating said output line and the associated input line and a second state for providing an electric path between said output line and the associated input line, and means for generating a ready signal when said output line is energized after the receipt of said access request signal, whereby said ready signal is produced through a desired period defined by the bit stage of said digital delay means associated to the input line coupled to the programmable element made in said second state from the time point of the receipt of said access request signal.

2. The device according to claim 1, in which said digital delay means includes a counter made of a plurality of bit stages.

3. The device according to claim 1, in which said digital delay means include a shift register made of a plurality of bit stages.

4. The device according to claim 1, in which said desired period is selected not less than the operation period of said producing means.

5. An integrated circuit comprising a memory circuit, a first terminal for receiving an access request signal for commanding an access request to said memory circuit, a second terminal for outputting read out data from said memory circuit through a response time thereof from the receipt of said access request signal, a third terminal for receiving a chain of clock signals, a shift register having a plurality of bit stages and having a reset terminal, means for applying a reset signal to said reset terminal when said access request signal is absent thereby to place the bit stages in their initial states, means for applying an input signal to said shift register when said access request signal is present, means for applying said chain of clock signals to said shift register as shift pulses, said shift register shifting said input signal one by one to said bit stages in accordance with said clock signal when said access request signal is present, a fourth terminal, a selection circuit having a plurality of input terminals, an output terminal, and selection means responsive to a desired one of said input terminals for energizing said output terminal, means for supplying said input terminals with output signals from said bit stages, and means responsive to a signal of said output terminal for applying a ready signal for indicating that data at said second terminal becomes valid to said fourth signal.

6. The circuit according to claim 5, in which said selection means includes a plurality of programmable elements, each being programmable into either a conducting state or a nonconducting state and coupled between the associated input terminal and said output terminal.

7. An integrated circuit comprising a memory circuit, a first terminal for receiving an access request signal for designating a read operation to said memory circuit, a second terminal for outputting read out data from said memory circuit through an operation time from the receipt of said access request signal, a third terminal for receiving a clock signal, a counter having a count input terminal and a plurality of different count output terminals, means for applying said clock signal to said count input terminal of said counter, means for controlling said counter so as to start counting said clock signals in response to receipt of said access request signal, a programmable selection circuit having a plurality of input lines coupled to said count output terminals, an output line, and a plurality of program elements each coupled between the corresponding input line and said output line, an electrical coupling between a selected input line and the output line being provided by the programmed state of the program element associated to the selected input line, a fourth terminal, means responsive to a signal from said output line of said programmable selection circuit for generating a ready signal for indicating that read out data is outputted at said second terminal, and means for applying said ready signal to said fourth terminal.

8. An integrated circuit comprising a memory circuit, a first terminal for receiving a chip select signal for enabling said memory circuit, a second terminal for receiving an access request signal for commanding a read operation to said memory circuit, a third terminal for receiving a chain of clock signals, a shift register circuit having a data terminal, a shift terminal and a reset terminal and composed of plurality of bit stages, means for connecting said third terminal to said shift terminal, a NOR gate receiving said chip select signal and said access request signal at its input terminal, a first inverter circuit having an input terminal coupled to an output terminal of said NOR gate, means for connecting an output terminal of said first inverter circuit, means for connecting said data input terminal of said shift register to the output terminal of said NOR gate, a plurality of first lines each coupled to associated one of outputs of said bit stages, a second line intersecting with said first lines, a plurality of program elements disposed at said intersections of said first lines and said second line, said program elements having either of first mode responsive to a level change of the associated first line for causing a level change at said second line and second mode causing no level change at said second line irrespective of the level change of the associated first line, a second inverter circuit having an input terminal coupled to said second line, a fourth terminal, a NAND gate receiving an output signal from said second inverter circuit and the output signal from said NOR gate, and means for applying an output signal to said fourth signal.

9. An integrated circuit comprising a memory circuit, a first terminal for receiving a strobe signal for making said memory circuit in an accessed state, a second terminal for receiving a chain of pulse signals, a counter circuit having a reset terminal, a count input terminal and a plurality of count output terminals, a first inverter receiving said strobe signal and an output terminal coupled to said reset terminal, means for supplying said count input terminal with said pulse signals, a plurality of program elements each programmable to provide a first state producing a first potential or a second state producing a second different potential, a plurality of Exclusive -OR gates, each receiving a signal from the associated count output terminal and a potential from the associated program element, an AND gate receiving output signals from said Exclusive-OR gates at its input terminals, a NOR gate receiving an output signal from said AND gate and said strobe signal, a third terminal, and means for connecting an output terminal of said NOR gate to said third terminal.

10. A memory device comprising a memory circuit, first means for receiving a strobe signal for placing said memory circuit in an accessed state said memory circuit starting a memory operation in response to a receipt of said strobe signal and completing it after a predetermined time period, digital delay means composed of a plurality of delay stages each outputting a different delay time, means for applying said strobe signal to said digital delay means as an input signal to be delayed, a programmable circuit having a plurality of input lines receiving the respective outputs of said plurality of delay stages, an output line, and a plurality of programmable elements coupled to the associated input lines and to said output line, each of said programmable elements taking a first state electrically isolating the associated input line from said output line or a second state electrically coupling the associated input line to said output line, and means responsive to a signal from said output line for generating a ready signal designating operating state of said memory circuit.

11. The device according to claim 10, further comprising means for receiving a chain of clock signals, said digital delay means operable with said clock signals and responsive to said strobe signal, said digital delay means taking an initial state when said strobe signal is absent while being enabled when said strobe signal is present.

12. An integrated circuit comprising a memory circuit, first means for receiving an access request signal for requesting an access operation to said memory circuit, said memory circuit completing a memory operation after a predetermined period of time has elapsed from receipt of said access request signal, means for receiving a series of pulse signals, digital delay means operated by said pulse signals and generating a plurality of delay output signals having different values, means for starting delay operation of said digital delay means in response to the receipt of said access request signal, selection means having a plurality of programmable elements, said selection means selecting one of said delay output signals in accordance with a programmed state of said programmable elements, and means responsive to the selected delay output signal for generating a ready signal indicating the memory operation of said memory cell is completed.

* * * * *

UNITED STATES PATENT AND TRADEMARK OFFICE
CERTIFICATE OF CORRECTION

PATENT NO. : 4,445,204
DATED : April 24, 1984
INVENTOR(S) : Nishiguchi

It is certified that error appears in the above-identified patent and that said Letters Patent is hereby corrected as shown below:

Column 1, line 26, "In recent years,..." should begin a new paragraph.

Column 1, line 59, change "a" to --the--.

Column 7, line 68, change "pulse" to --pulses--.

Signed and Sealed this

First Day of January 1985

[SEAL]

Attest:

GERALD J. MOSSINGHOFF

Attesting Officer     Commissioner of Patents and Trademarks